(12) United States Patent
Malone et al.

(10) Patent No.: US 7,958,196 B2
(45) Date of Patent: *Jun. 7, 2011

(54) MESSAGING SYSTEM

(75) Inventors: David Malone, Dublin (IE); Timothy Cahill, Greystones (IE); Gabrielle Stafford, Rialto (IE); John Fortune, County Dublin (IE); Michael Coughlan, Leixlip (IE)

(73) Assignee: OTOwest, LLC, Charlestown, MA (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/192,284

(22) Filed: Aug. 15, 2008

(65) Prior Publication Data

US 2008/0313294 A1    Dec. 18, 2008

Related U.S. Application Data

(63) Continuation of application No. 09/832,901, filed on Apr. 12, 2001, now Pat. No. 7,426,533.

(30) Foreign Application Priority Data

Apr. 13, 2000  (EP) ..................................... 00650033

(51) Int. Cl.
*G06F 15/16*    (2006.01)

(52) U.S. Cl. ...... 709/206; 709/203; 709/217; 705/14.49

(58) Field of Classification Search .................. 709/206, 709/207, 217, 203; 705/14.4–14.67, 14.72, 705/14.73

See application file for complete search history.

(56) References Cited

U.S. PATENT DOCUMENTS

| | | | |
|---|---|---|---|
| 5,283,856 | A | 2/1994 | Gross et al. |
| 5,793,972 | A | 8/1998 | Shane |
| 5,930,764 | A | 7/1999 | Melchione et al. |
| 6,161,130 | A | 12/2000 | Horvitz et al. |
| 6,715,145 | B1 | 3/2004 | Bowman-Amuah |
| 6,721,713 | B1 | 4/2004 | Guheen et al. |
| 6,731,625 | B1 | 5/2004 | Eastep et al. |
| 6,742,015 | B1 | 5/2004 | Bowman-Amuah |
| 6,754,181 | B1 | 6/2004 | Elliot et al. |
| 6,801,929 | B1 | 10/2004 | Donoho et al. |
| 6,842,906 | B1 | 1/2005 | Bowman-Amuah |

(Continued)

OTHER PUBLICATIONS

WO2001/080105 A3, publication of Corrected Version of International Search Report of corresponding parent patent application No. EP 00650033.4 filed Apr. 13, 2000, ISR publication date Sep. 12, 2002, publication of correct version, Apr. 22, 2004.

(Continued)

*Primary Examiner* — David Lazaro
(74) *Attorney, Agent, or Firm* — Lewis and Roca LLP

(57) ABSTRACT

A messaging system comprises a server which registers clients (users) and stores uploaded contact data in contacts databases. The contact databases have meta data including profile attributes indicating the subject matter profiles of the contacts. A content manager receives content items such as collateral parts and message text and stores them in content databases, also with meta data having profile attributes. When a client requests a message to be sent to a contact, the content manager automatically identifies relevant content items according to the profile attributes, and a messaging engine sends a message with a wrapper having links to these content items. When the contact responds, a response management function captures response data and instructs a build engine to build content from the identified items. The content is then sent to the contact.

13 Claims, 5 Drawing Sheets

U.S. PATENT DOCUMENTS

| | | |
|---|---|---|
| 6,909,708 B1 | 6/2005 | Krishnaswamy et al. |
| 6,931,434 B1 | 8/2005 | Donoho et al. |
| 6,957,186 B1 | 10/2005 | Guheen et al. |
| 6,985,901 B1 | 1/2006 | Sachse et al. |
| 7,069,234 B1 | 6/2006 | Cornelius et al. |
| 7,124,101 B1 | 10/2006 | Mikurak |
| 7,130,807 B1 | 10/2006 | Mikurak |
| 7,139,999 B2 | 11/2006 | Bowman-Amuah |
| 7,145,898 B1 | 12/2006 | Elliott |
| 7,149,698 B2 | 12/2006 | Guheen et al. |
| 7,165,041 B1 | 1/2007 | Guheen et al. |
| 7,167,844 B1 | 1/2007 | Leong et al. |
| 7,197,534 B2 | 3/2007 | Donoho et al. |
| 7,225,249 B1 | 5/2007 | Barry et al. |
| 7,246,150 B1 | 7/2007 | Donoho et al. |
| 7,277,919 B1 | 10/2007 | Donoho et al. |
| 7,289,964 B1 | 10/2007 | Bowman-Amuah |
| 7,315,826 B1 | 1/2008 | Guheen et al. |
| 7,346,655 B2 | 3/2008 | Donoho et al. |
| 7,426,533 B2 | 9/2008 | Malone et al. |
| 2001/0034763 A1 | 10/2001 | Jacobs et al. |
| 2001/0047297 A1 | 11/2001 | Wen |
| 2002/0032602 A1* | 3/2002 | Lanzillo et al. ............... 705/14 |
| 2002/0065947 A1 | 5/2002 | Wishoff et al. |

OTHER PUBLICATIONS

R. Cross et al., "E-Mail Direct Marketing Comes of Age", Direct Marketing, Oct. 1999, pp. 44-45, Oct. 1999.

A. Schwartz, "Spread The Word With Mailing Lists", [Internet] http://www.webtechniques.com, Jun. 2000, pp. 63-66.

J. Viega et al., "Mailman: The GNU Mailing List Manager", 1998 LISA XII, Dec. 6-11, 1998, pp. 309-316, Boston, MA, USA.

* cited by examiner

MESSAGING SYSTEM

CROSS REFERENCE TO RELATED APPLICATIONS

This application is a continuation of co-pending U.S. patent application Ser. No. 09/832,901, filed Apr. 12, 2001, which claims priority to EPO Patent Application Number 00650033.4, filed Apr. 13, 2000, both of which are hereby incorporated by reference as if set forth herein.

INTRODUCTION

1. Field of the Invention

The invention relates to communication of information for applications such as marketing.

2. Prior Art Discussion

In general, it is very time-consuming and expensive for sales or marketing personnel to visit targeted contacts to obtain sales of various goods or services. This has over the years led to development of various collateral deployment, direct marketing and customer touch techniques. The traditional technique is to post a brochure to a targeted contact, the contact data being maintained in a database. While this approach is much less expensive than physically visiting a targeted contact, it is not particularly effective because it is time-consuming for the contact to reply. Also, there is significant cost associated with the production, management and distribution of printed material. The passive and general nature of the communication can make it difficult to quantify its success rate.

A further development of this technique has been to use email an electronic mail messaging system such as Outlook Express™ for generating and sending messages to deliver advertisements to targeted contacts. This has the advantage that it is a more active medium and it is easier for the contact to respond.

OBJECTS OF THE INVENTION

The invention is directed towards providing a messaging system allowing:
 generation of content which is more relevant to the recipient without considerable time input from the sender; and/or
 easier recipient response; and/or
 tracking of responses with less sender time input.

SUMMARY OF THE INVENTION

According to the invention, there is provided a messaging system comprising a messaging engine for operating under user instructions to generate and transmit messages addressed to recipient contacts; characterized in that the system comprises a server comprising:
 a client interface comprising means for allowing access by a plurality of users of registered clients;
 a client manager comprising means for maintaining a database of registered clients;
 a content manager comprising means for receiving content items uploaded from users and for storing said content in a content database;
 means in the content manager for selecting content items for a message;
 means in the messaging engine for generating and sending a message with links to selected content items in the content database;
 a response management function comprising means for monitoring a response from a recipient contact using said links;
 a build function comprising means for building content for the responding recipient contact according to the links used by said contact to respond; and
 means in the response management function for sending the built content to the responding recipient contact.

In one embodiment, the content manger comprises means for storing profile attributes for content items, and for selecting content items according to said attributes.

In another embodiment, the profile attributes are included in meta data.

In a further embodiment, the server further comprises a contacts manager comprising means for managing a contacts database of contacts uploaded by users, in which contacts are associated with the users and with profile attributes.

In one embodiment, the content manager comprises means for selecting content items by matching profile attributes of a contact with profile attributes of the content items.

In another embodiment, the content items comprise content collateral parts and message text uploaded by users.

In a further embodiment, the content manager comprises means for managing a database of templates, in which each template is a group of identifiers of collateral parts and message text for re-use by a user.

In one embodiment, the content manager comprises means for managing a database of wrappers, in which each wrapper comprises links to selected content items.

In another embodiment, the content manager comprises means for grouping content items at the levels of a user organization, a user group written on organization, and individual users.

In one embodiment, the messaging engine comprises means for generating each link in a manner whereby it is unique to the message, and the response management function comprises means for monitoring said links to identify the responding recipient contacts.

In another embodiment, the server comprises a response reporting function comprising means for generating management reports using data captured by the response management function.

In a further embodiment, the messaging engine comprises means for allowing a user to directly enter content to a message without previously uploading it to the content manager.

In one embodiment, the messaging engine comprises means for:
 receiving a message generated by a user locally using an external messaging application;
 parsing said message and generating a message having a wrapper with links to content of the content database according to the parsing.

In another embodiment, the messaging engine comprises means for parsing a header for content in the received message, and for using said header to identify relevant content in the content database.

According to another aspect, the invention provides a method of, under user instructions, generating a message and sending it to a recipient contact, the method being carried out by a server and comprising the steps of:
 a user uploading content collateral and message text to the server, and the server storing said collateral and text with profile attributes;
 the user uploading contact data, and the server storing the contact data with profile attributes;
 generating a message by matching profile attributes of the contact with those of the content to select content, and including in the message uploaded message text and links to said selected content;

transmitting the message to the contact;

subsequently receiving a response from the contact using a link, capturing data including identifiers of the contact and of the content; and generating a response report based on said captured data.

In one embodiment, the link is unique to the combination of contact and content, and the link is used to capture said data, and the step of receiving the response comprises the further step of determining an actual address for the content based on the link address.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
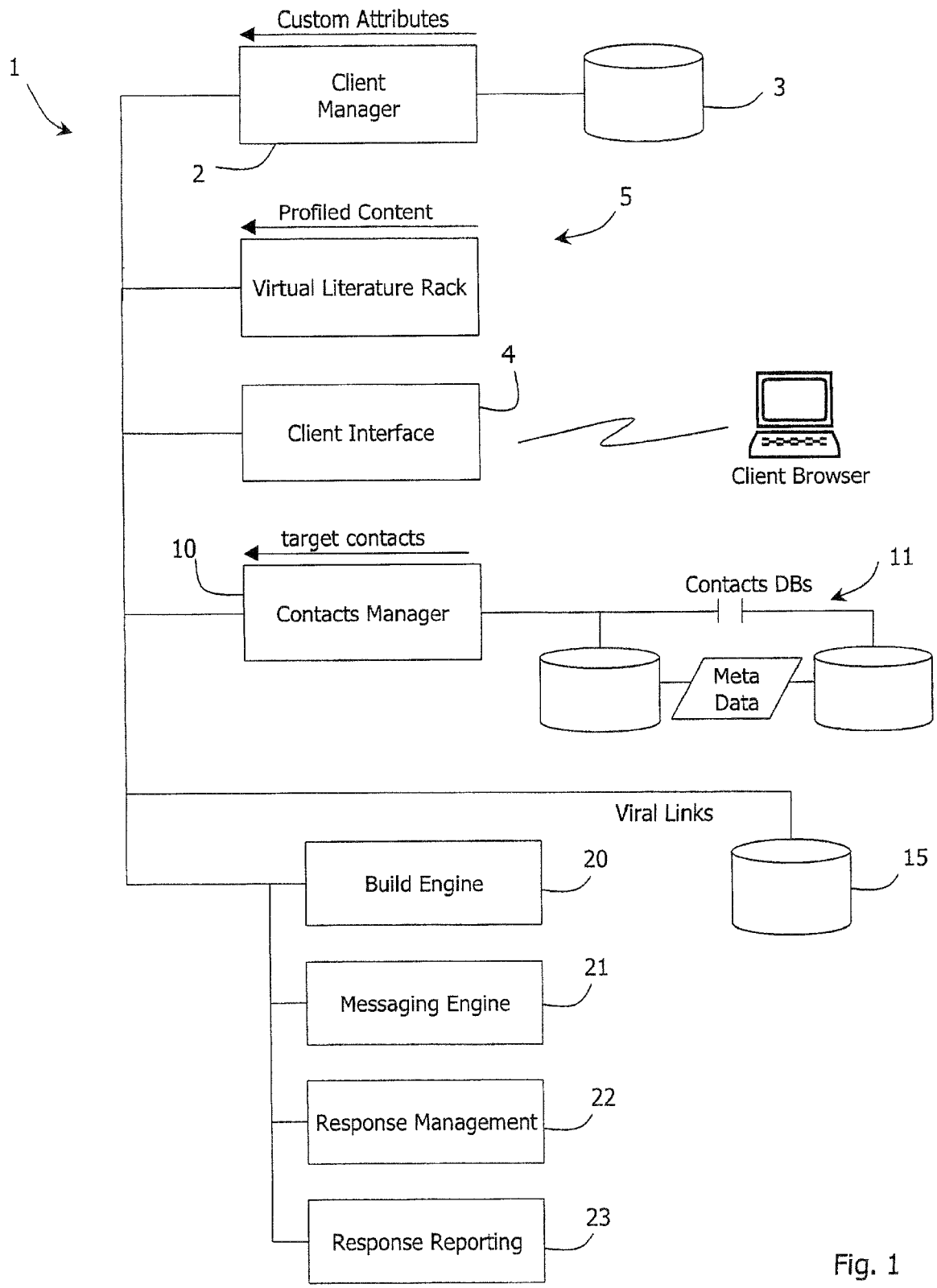
FIG. 1 is a schematic representation of a messaging system of the invention.

Referring to the drawings, and initially to FIG. 1 there is shown a messaging system 1 of the invention. The system I comprises databases and executables residing on a server having communication stacks for Internet communication. In this embodiment, the system 1 is configured for direct marketing applications, however, it may alternatively be configured for any other application which would benefit from messaging in a highly targeted and personalized manner, and which assists and encourages recipients to reply. Other applications include polling of customers to gather information about their requirements, distribution of software upgrades, or carrying out surveys.

System Structure

A client (or user) manager 2 manages a database 3 of registered clients and related data. Clients use the system for sending messages, and responses from targeted contacts are managed and monitored. Each client has one or more users, and users may be registered in the database 3 on an individual basis or in user groups. Clients use a browser to access the system 1 at a client interface 4 of the system 1. The interface 4 provides simple navigation to functions of the system 1.

A content system 5, called a Virtual Literature Rack™ (VLR™), provides profiled content, i.e. content which is personalized to be relevant to the recipient contract. It is described in more detail below.

A contacts manager 10 provides access to contacts databases 11 having a data for lists of contacts uploaded by clients. A database 15 provides viral links for use in advertisements. The system 1 also comprises a build engine 20, a messaging engine 21, a response management function 22, and a response reporting function 23. These are multi-threaded functions having Java-coded rule bases.

Figure 2:
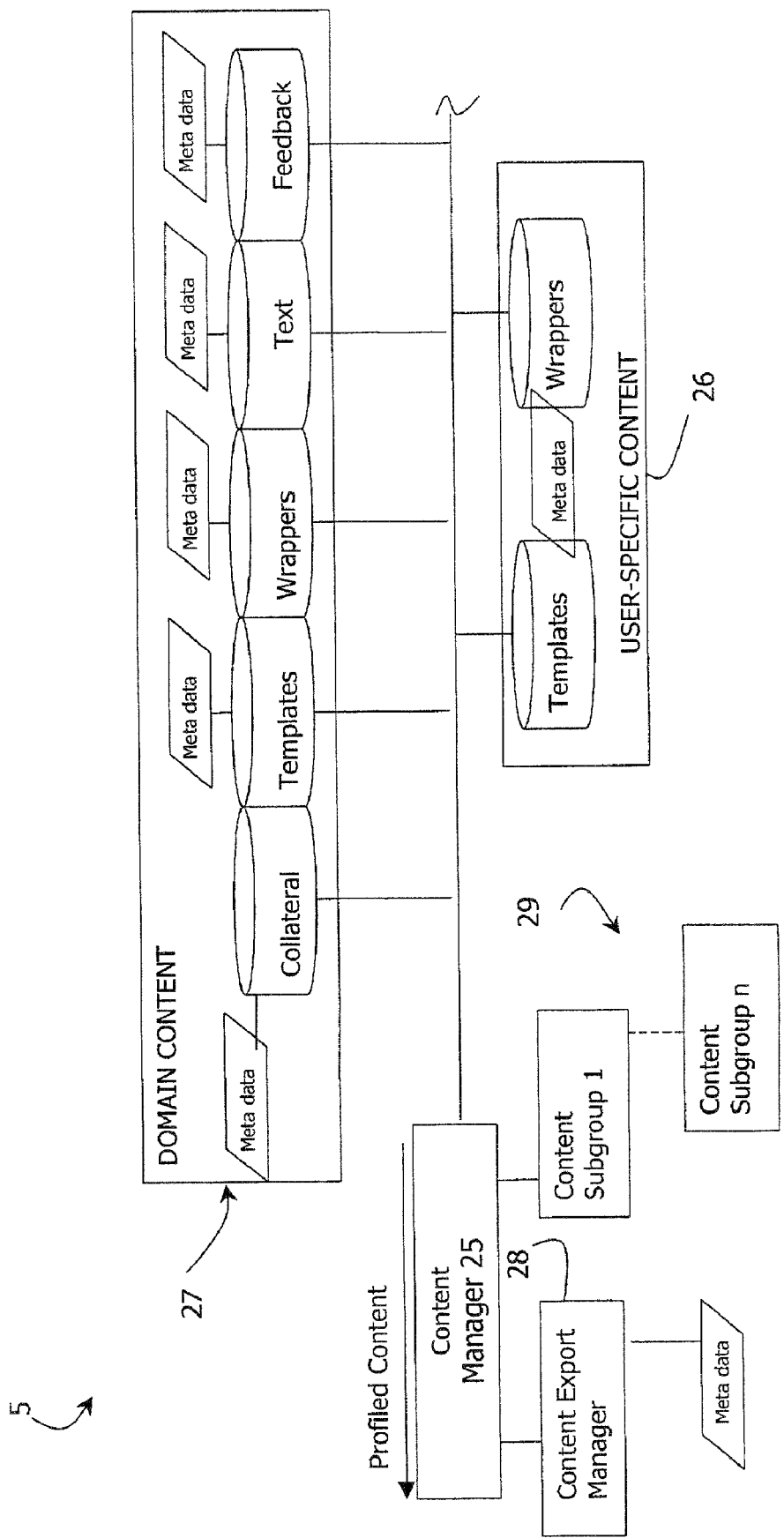
FIG. 2 is a diagram illustrating a Virtual Literature Rack of the system.

Referring to FIG. 2, the VLR™ 5 is illustrated in detail. The VLR™ 5 comprises a content manager 25 linked to user-specific content databases 26 and to domain content databases 27. The manager 25 is also linked to a content export manager 28 and to subgroups content databases 29. The domain content databases 27 comprise databases for collateral, templates, wrappers, text, and feedback. The word "domain" means uploaded by a client administration user.

The collateral database stores content in units called "parts", Parts are in Adobe™ PDF video, audio, or HTML format. The collateral database has meta data in a look-up table, said meta data having attributes for profile, client, and file type (format). Returning again, to the contacts database 11, this also has meta data having attributes, in this case for profile. In both cases the profile is the subject matter or field associated with the collateral part or contact. The content manger 25 uses profile attributes from the contacts database to retrieve collateral parts according to the meta data.

The collateral parts are uploaded by clients via the client interface 4. The clients also upload message text to the text database, message wrapper links to the wrapper database, and response options for a recipient contact to the feedback database.

The content manager 25 automatically adds a client catalog attribute to the meta data, linking each database record to a client's catalog for a messaging operation. The content manager 25 also automatically populates the template database with templates for storage and re-use of stored records for catalogs. For example, the set of collateral parts (called a "catalog") for a marketing operation of a client is stored in the template database.

The content in the domain content database is usually uploaded by an administration user of a client. On the other hand, content uploaded to a user-specific database 26 is uploaded by, and associated with, a particular user of the client. Also, each client may have sub-groups of users, for example a marketing department or a research department. The sub-groups 29 link together content according to user sub-groups.

The content export manager 28 is programmed to export content under instructions from the messaging engine 20. When doing so, the wrapper links are assigned a unique URL for each targeted recipient contact identified by the contacts manger 10. Thus, a single collateral part of the collateral database will have as many URLs as there are targeted contacts. The response management module 23 is programmed to subsequently process these URLs in recipient contact responses. Its uses look-up tables to determine part identifiers for the contacts. The response management module 23 is programmed to subsequently process these URLs in recipient contact responses. It uses look-up tables from the contact-specific URL. In doing so, it automatically captures the information that the relevant contact has responded. This information is used by the response reporting function 23 to generate information reports on the responses to any particular messaging operation.

At a general level, the major system operations are as follows:

A client uploads collateral, text, and feedback options, to the content databases 24, 27, or 29 as appropriate.

The client either uploads a contacts list or selects one using the contacts manger 10.

The content manager 25 of the VLR™ 5 uses profile attributes in the contacts list to identify content for each message to each contact.

The messaging engine 21 creates a message for each contact, the message comprising (client-uploaded) text and automatically-created wrapper links. The engine 21 then sends each message.

In due course, some recipient contacts respond by activating links in the wrappers. The links route HTTP requests to the system 1, and these are intercepted by the response management function 22, which determines the physical URL in the VLR™ 5 and captures response information.

The response management function 22 activates the build engine 21 to build content on-the-fly according to the meta data. In some instances the build engine 21 pre-builds and the function 22 only needs to retrieve it.

The messaging engine 22 then sends the content to the responding contact.

The reporting function 23 subsequently uses data captured by the function 22 to generate response reports.

Client Setup

In order for an organization or individual to become a client, they must initially be registered as a client and given a domain. New clients are created by the client manager 2 capturing details inputted using a browser, such as Company Name, Domain, Alias, and Status. The proposed client clicks a save button and a number of new options become available for selection including an option to upload an image for personalized branding. By clicking on a Primary Contact button, the proposed client is brought to a new page where the following information must be completed: Contact Title, Company, First name, Last name, Division, Job Title, Address 1 & 2, City, Zip, State, Country, Telephone, Email, Fax, URL, Status, External ID and Security Key Value(s). The proposed client chooses the user Type for the Primary Contact. This is usually a Domain Administrator. Usernames and passwords are initially created in this area. The proposed client then saves these details and is returned to a Client List page.

Client Settings

The client may also do the following:
Enable Web fulfillment.
Enable Secure Documents, a facility to send secure documents to contacts within a domain, and
Set access control. The client may assign an administrator to have access control on a given domain. Client usage of the system 1 is tracked by the client manager 2 with the following parameters:
Status—Quantity and Size of all Messages
Usage—Number of Messages, Recipients and Responses
Client users associated with a client account
In the Client Manager 2 client users are listed by Name, Role, Status, and Activity.
Managing Contacts. Users must also manage their contact/recipient lists, the functionality being provided by the contacts manager 10. New contacts are added using the following process;
Click 'Add' button on a 'Contacts Listing' screen
Fill in details in a 'New Contact' window
Click 'Save' to add contact to list of contacts
New groups are added using the following process:
Click 'Group' button on a 'Contacts Listing' screen
Click 'Add' on the 'Groups Listing' screen
Fill in the relevant details
Click 'Save' to add to the list of groups
Contacts may also be user added to user groups by adding to or selecting groups.
Contacts are uploaded as a tab or comma delimited contact list. Each detail is mapped to the relevant field, for example a contacts' last name is linked to the last name field.

Users can send one message to multiple contacts or to a group of contacts. They can personalize the text message and the salutation. Users can define the message greeting and signature for the text message by selecting from pre-defined options.

Feedback Options

The client can define feedback mechanisms on the fly to suit a particular campaign or price break offer, for example. The user can send messages to the contacts of users associated with their client account without actually gaining access to full details pertaining to those contacts. For example, marketing managers may need to track regional responses as well as price breaks, but they would not have access to the contact name and company details. Thus, the response reporting function 23 provides comprehensive feedback data to the user indicating effectiveness of the campaign.

Operation of the System 1

Figure 3:
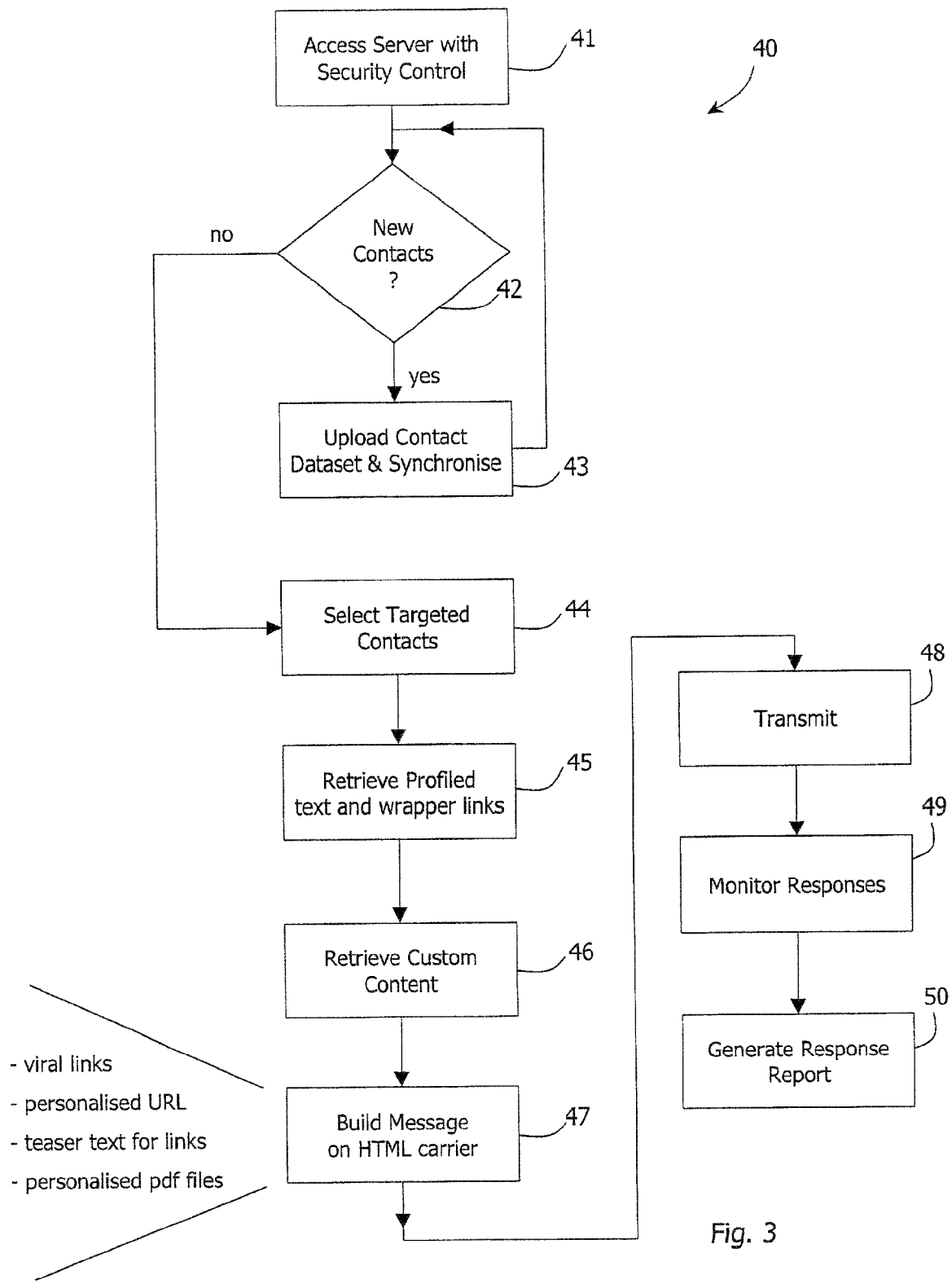
FIG. 3 is a flow diagram illustrating operation of the system in one mode.
Figure 4:
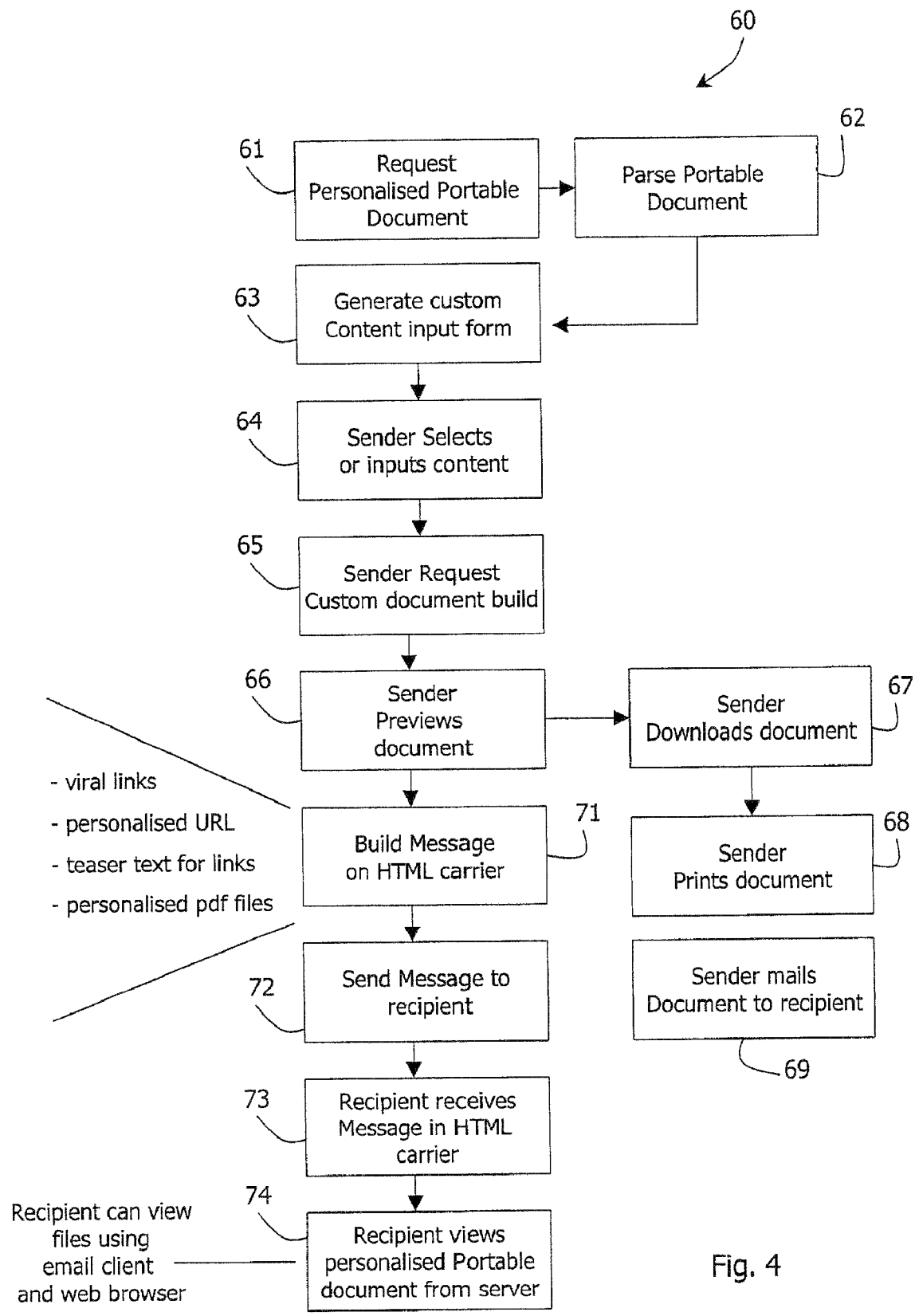
FIG. 4 is a flow diagram illustrating operation of the system in another mode.
Figure 5:
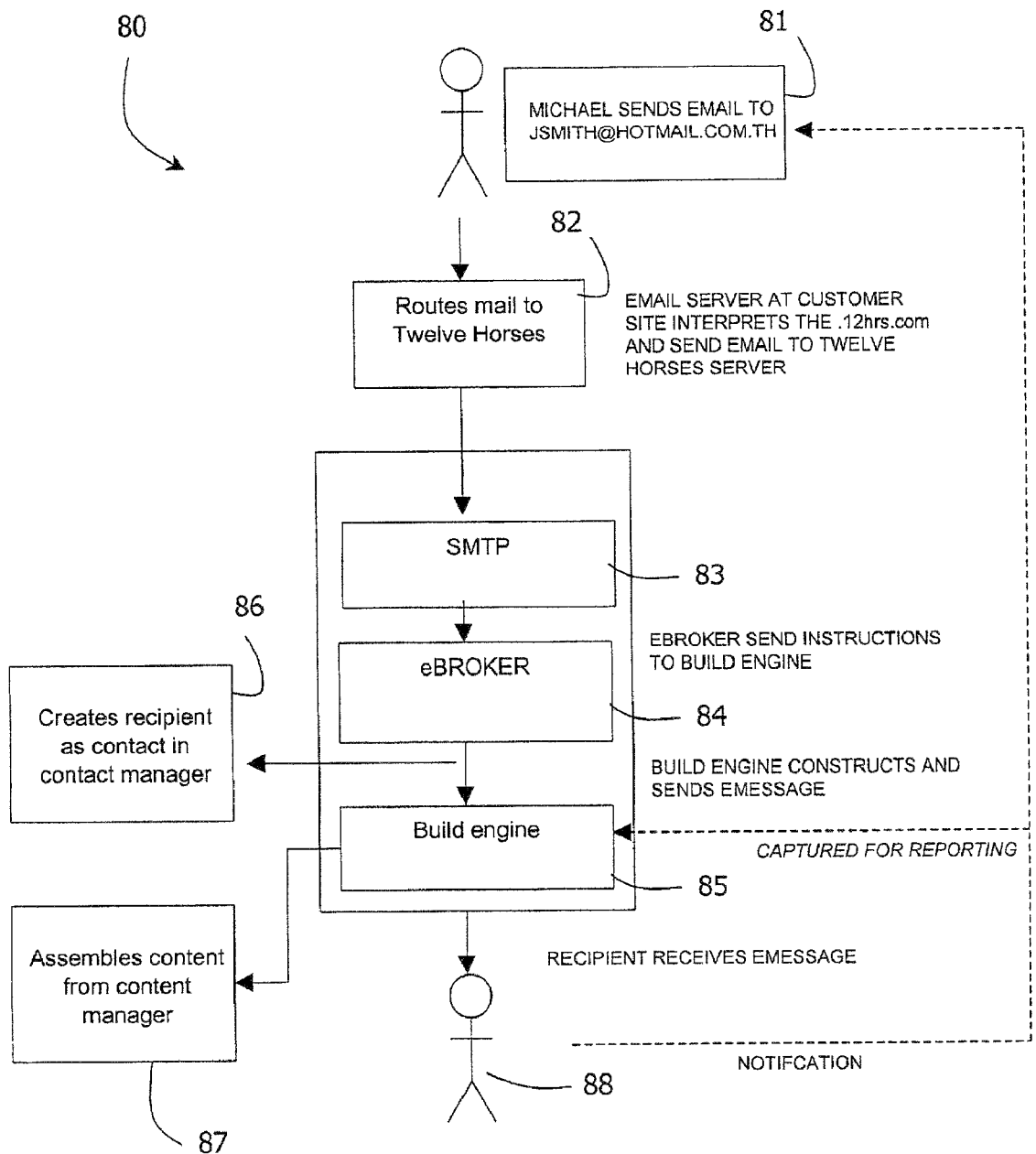
FIG. 5 is a flow diagram showing operation of the system in a still further mode.

Operation of the system in one mode is now described with reference to FIG. 3, which illustrates a direct marketing method 40 in flow chart format. In step 41, client accesses the system 1 via the interface 4, which applies very strict user access control on the basis of domain, password and username criteria retrieved from the client manager 2. The client may choose to update the contacts which are associated with him or her or the domain to which he or she is associated, as indicated by the decision step 42. If so, in step 43 the client uploads a contact list. The list is used to update the relevant contact database 11 in a manner which is synchronized with the existing data.

To begin a messaging session, the client selects targeted contacts in step 44 by selecting particular contacts from the contacts database 11. The contacts manager 10 ensures that there is access only to his/her contact database. The client may also in this step upload content, or alternatively choose a template for use of previously-uploaded content.

The content manger 25 identifies content according to the profile attributes for each contact and the messaging engine 21 automatically retrieves text and wrapper links in step 45. The following sets out the client interfacing.

The user clicks a New eMessage button on the menu in the web browser. The user is presented with a new page, namely a Create eMessage Page. The first area that the user is presented with is the 'Use eMessage Template'. The user clicks 'GO' and is directed to the eMessage Template page. By selecting a check box on the left hand side, the user selects an eMessage Template. The user then clicks 'Add' and the eMessage Template populates each of the eMessage areas. These are as follows:
eMessage Body
Smart Attachments
Feedback Form
Quick Reply Options
Wrapper To select recipients, the user clicks 'Go' beside the Add Recipients area. Upon entering this page the user has the option of selecting contacts or groups, and the user chooses a contact or group by selecting the checkbox on the left hand side, clicks 'add' and is returned to the Create eMessage page. The user may preview the eMessage prior to sending it by clicking the preview button. To instruct sending the eMessage, the user clicks 'Send'. Once the eMessage is sent the user receives a confirmation message.

The user may also send an eMessage without using the eMessage Template. Rather than selecting the eMessage Template option, the user creates an eMessage Template step by step as follows:

Add eMessage Body

The eMessage body consists of the Subject, Salutation, Name Format and Message Body. The user clicks the 'Go' button beside the Add eMessage Body and selects from the list screen provided by selecting the checkbox and clicking 'Add'. The user may also manually input text into these fields.

Add Smart Attachments

VLR™ parts are added to the eMessage by clicking 'Go' in a Add Smart Attachments area. As with Contacts and Groups, users may tab between Documents and Kits. The user may select one or more Smart Attachments using the checkbox and clicking 'add'. Once the Smart Attachment has been added to the list, the user may perform a number of key tasks, including:

Changing the order in which the Smart Attachments are presented by selecting the piece and using the 'Move Up' and 'Move Down' options.

A piece may be removed from the list by selecting the piece and clicking 'remove'

Teaser text may be added to the document by selecting the document and clicking the 'Add Teaser Text' option. (Pop up screen)

Annotations are added by selecting the document and clicking the 'Preview/Annotate' option. (Pop up screen)

Personalized documents (forms) may be completed and saved by selecting the 'Personalize' option.

Use Feedback Form

The user clicks the 'Go' button beside the Use Feedback Form and selects from the list screen provided by selecting the checkbox and clicking 'add'.

Quick Reply Options

The user may input up to four quick reply options. The user can chose either the Feedback Form option or the Quick Reply Option.

Use Wrapper Template

The user clicks the 'Go' button beside the Use Wrapper Template area and selects from the list screen provided by selecting the checkbox and clicking 'add'. Only one wrapper may be selected at a time.

Managing Messages eMessages are managed in the mail box. The mail box lists the following information for each send: Message title, Send date, Number of recipients, Number of opens, Number of replies, and Number of forwards.

All reply details are accessed from a feedback statistics page, which is linked to the outgoing eMessage listed in the Mailbox, Feedback Statistics The feedback statistics page includes the ability to track document and wrapper hits, to isolate new reads as well as new replies and the ability to view and export all text replies from a single page. Users can isolate groups of recipients for follow-on messages.

Thus, for example, a technical buyer in an airline company would receive a marketing message with airline text which is technically flavored.

In step 46, the messaging engine 20 retrieves client-specific custom content from the database 3. The custom content may, for example, include a signature, a photograph, logos, custom cover letters or any other content specific to the client.

In step 47, the messaging engine 20 builds a marketing message using the retrieved text wrapper links and custom content. Viral links are retrieved from the database 15. These are links to a Web site which acts as a sales lead generator. Each message is uniquely created for the targeted contact in a preformatted profiled HTML carrier which can accept hot links, text, and images. The carrier includes a number of links which direct a targeted contact to a view of a printable document. "Teaser text" messages are automatically displayed when the contact scrolls over the links. This allows a greater level of customer engagement.

The generated message is then exported to a delivery file and is transmitted by the messaging engine 21 in step 48. It is not essential that the message be transmitted by email. It may, in addition or alternatively, be faxed, printed and delivered by a postal or courier service, or sent to a wireless device with full content, or as an alert depending on circumstances.

The targeted contacts receive an email, fax, printout, or wireless message. Email recipients receive a profiled html carrier which includes brand art, message text, thumbnail and written synopsis of content associated with the message. Each element contains an html link to content contained in the VLR™ 5. The response management function 22 in step 49 records each action the recipient takes in the response message, for example, clicking a link or viewing referenced content. The html email also contains a form that enables recipients to respond to the sender from within the message. This form may resemble the calls to action found in traditional direct mail. If the email recipient decides to respond using the 'reply' function in their email client the system captures that action and either forwards the reply to the sender via email or via the web client, or stores the reply in the system 1 for reporting and later retrieval.

The reporting function 23 generates a response report offline at any stage, as indicated by the step 51. This is based on data captured by the response management function 22, in turn based on the URLs in the responses.

The following describes operation of the system in a method 60 with reference to lg. 4, which illustrates a one-to-one manual profile content fulfillment method in flow chart format. In this mode, the system does not use profile data of the contacts database, and indeed the contacts may not be in this database. The profile data is dynamically inputted by the client.

The client selects a New eMessage function, and is presented with a Create eMessage Page. The first display that the user is presented with is a 'Use eMessage Template' The user clicks 'go' and is directed to an eMessage Template page. By selecting a check box on the left hand side, the user selects an eMessage Template. The user then clicks 'Add' and the eMessage Template populates some or all of the of the eMessage content types, namely eMessage Body, Smart Attachments, Feedback Form, and HTML. To select recipients, the user accesses the contacts database 11. The user can select a contact or create one on the fly.

In a Smart Attachments section, the user chooses a personalized portable document in step 61. The system 1 dynamically parses a PDF in step 62 and constructs a html input form in step 63 listing document form fields and presents it to the user for inputting details. Data that is already held on the system is pre-filled upon input form presentation, for example, "First name". Additional profile information is completed by the user in step 64 on-the-fly. Upon form completion the user may preview the personalized document and the system 1 checks the mandatory fields. The client saves the document with a request for custom document build in step 65 and previews it in step 66. He or she may download it in step 67, print it in step 68, and may physically mail the custom document in step 69.

The messaging engine 21 generates a message using relevant text and wrapper links in step 71 and sends the message in step 72. The recipient receives it (in the HTML wrapper) in step 73, and in step 74 responds to the links to retrieve the content built by the build engine 20.

The method 60 allows excellent versatility in choice of recipient contact, while availing of use of the VLR™ 5.

Operation of the system is now described for automatic personalized data delivery and tracking requests made by a third party system. A third party system may send a request for personalized data delivery to it. The system 1 validates that the request contains the data required to create the personalized message. It may confirm that the required personalized variable data was provided by the third party system by validating address fields for the requested delivery vehicle. For example, if a request's delivery vehicle is eMessage, the system 1 will validate the recipient's email address; if the request is fax the system will ensure the phone number has the correct number of digits.

For email delivery the content manager 25 constructs personalized content made up of a defined HTML carrier, eMessage text, a reference to the requested documents in the content data base and required variable data. The messaging engine 21 sends the eMessage to the recipient, and sends confirmation of the sent eMessage to the third party system. The system captures the send event for reporting.

Operation of the system in a method 80 is now described with reference to FIG. 6 which illustrates the automatic sending of a message containing profiled content, in which the client interface is not browser access to the system 1, but an email application. This gives users the ability to send branded media-rich messages with references to VLR™-based content. The ability to give access to rich email without clogging up a recipient's inbox with attachments is an advantageous aspect of the system 1.

In step 81, the client selects the "new mail" option in their conventional email application. The client selects recipients, and appends a predefined character set to the address of the recipients. The user then inputs a text message. The client selects the documents to be included in the message by inserting an attachment from the content folder on their email application. This content folder was previously exported from the system 1 and contains thumbnail previews and server references to content in the VLR™ 5. The user selects an HTML wrapper by inserting an attachment from the content folder on their desktop. The user sends the email. The predefined character set used in the email address routes the email to the system 1. The system 1 parses the email in an SMTP layer 83, and constructs an eMessage as described for the other modes of operation.

An eBroker function 84 of the messaging engine 21 uses the server reference to send instructions to the build engine 20 to build content drawing from the VLR™ 5. The eBroker component also enters the recipient details into the contacts database in step 86. The step of the build engine 20 building the content is indicated by the numeral 87.

The original message is then sent to the recipient who can access the built content as described for the other modes of operation.

Operation of the system is now described for a visitor to pull personalized information from a web site and have it delivered directly into their email client or as hard copy. This enables the client to automatically fulfill web requests for information. This is a advantageous element of the system as details for each literature request are stored in the VLR™ 5.

A web visitor selects a Get Literature button from the interface 4. They are presented with context specific literature i.e. if they are in a web page concerning product information they are presented with product-related literature, if they are in a web page concerning customer service they are presented with service-related literature. The web visitor selects the information they require and fills in a form with the contact details. The information is captured in the contacts database 11, the content they requested is retrieved from the VLR™ 5 and the build engine 20 constructs and sends the content in the requested medium and captures the event for reporting.

It will be appreciated that the invention enables both the sender and the recipient to track all messaging and response activity using an electronic network such as the Internet. The invention also allows the distribution of mass personalized context sensitive messages using a direct mail model enabling the recipient to respond using the Internet. Another feature is the use of a combination of traditional printed direct mail pieces and an electronic medium to create qualified sales leads and improve sales effectiveness.

It will be appreciated that the system 1 is self-managed, that is managed by clients.

Content can be assembled on-the-fly during a send request. Automatic content assembles can be based on sender, recipient or content information. The system can be used for applications such as personalized collateral deployment in both hard and soft copy, customer response, direct marketing, lead generation, customer touch strategy and online collaboration. This invention comprises means for one-to-one, one-to-few, and one-to-many communications.

It will be appreciated that personalized data is sent to a recipient based on their expressed and implied interests. This information can be sent in any chosen medium, for example email, fax, digital print and wireless communication. The medium can be determined by either the sender or the recipient. It is expected that as new delivery mediums emerge the system will incorporate their use.

Personalized content delivery in a chosen medium can be pushed to a recipient using a web client or email client, pushed to a recipient automatically by a third party system via an Application Program Interface, or pulled from a web site by the recipient. The system captures all pulled requests and stores all the relevant send, content and tracking information. This information is available for the relevant client through a web client. The system can construct content elements into a single message at the time of the send request. Content can be constructed based on predefined sender, recipient and/or content element attributes.

Recipients of personalized content delivered via email by the system can easily respond from within the message. This response is tracked by the system. The sender can access this information in their secure web client.

The email delivery encompasses the following elements:
Text—the body text of the email
Wrapper—the html carrier for the email
Smart Attachments—references to server based content. This content can be viewed online, or downloaded at the preference of the recipients. Smart attachment elements include:
Thumbnail: graphical representation of the content
Synopsis; short description of the content
Feedback form—Call to actions echoing direct mail
Viral links—to the site of system 1 or other possible sites
Unsubscribe—the ability to unsubscribe from this service
Forward to a Friend—the ability to forward the message in a personalized manner There is no need to send attachments as part of the email deliverables, only references to server-resident files that have been created in the VLR™ 5. It is not necessary for users to upload files to the server when they are required to send these to a recipient. Another advantage of the invention is that for content sent via email there is no requirement for client side software other than a standard email application and web browser to read the content. This is due to the intelligent design of the deliverable. Content can include a portable document such as Adobe PDF™, HTML, Flash, Video, Audio or SMS files. Personalized PDFs are also used for digital print and fax deliverables.

In the event that the initiator needs to send a secure document to a recipient the referenced content is marked as secure. There are three levels of security built into the content manager 25. The recipient will receive the personalized html email as described above. Beside the secure Smart Attachment there is a PIN number form field and a submit button. Unless the recipient has access to a PIN and submits this number as part of the email/html session the server will not release the content to the recipient. The PIN number is unique to each recipient and forms part of the identity profile in the contacts database for that recipient. This level of identification enables the system to complete commercial transactions by enabling the recipient to authenticate themselves. This unique PIN can also be extended to a hardware key device. It will be appreciated that the security features only require one click to view/hear the content. This avoids the necessity of clicking on a link, and subsequently verifying identity.

The invention is not limited to the embodiments described but may be varied in construction and detail.

The invention claimed is:

1. A messaging system comprising a messaging engine for operating under user instructions to generate and transmit messages addressed to recipient contacts;
    characterized in that the system comprises a server comprising:
    a client interface state machine comprising:
        means for allowing access by a plurality of users of registered clients;
    a client manager state machine comprising:
        means for maintaining a database of registered clients;
    a content manager state machine comprising:
        means for receiving content items uploaded from users, and
        means for storing said content in a content database;
    a messaging engine state machine comprising:
        means for generating and sending a message with links to selected content items in the content database,
        means for receiving a message generated by a user locally using an external messaging application, and
        means for parsing said message and generating a message having a wrapper with links to content of the content database according to the parsing;
    a response management function state machine comprising:
        means for monitoring a response from a recipient contact using said links, wherein the response management function state machine is configured to automatically capture and record each action that the recipient contact takes in the message, and
        means for sending built content to the responding recipient contact; and
    a build function state machine comprising:
        means for building content for the responding recipient contact according to links used by the responding recipient contact to respond.

2. A messaging system as claimed in claim 1, wherein the content manager state machine further comprises:
    means for storing profile attributes for content items, and for selecting content items according to said attributes.

3. A messaging system as claimed in claim 2, wherein the profile attributes are included in meta data.

4. A messaging system as claimed in claim 2, wherein the server further comprises a contacts manager state machine comprising:
    means for managing a contacts database of contacts uploaded by users, in which contacts are associated with the users and with profile attributes.

5. A messaging system as claimed in claim 2, wherein the content manager state machine further comprises:
    means for selecting content items by matching profile attributes of a contact with profile attributes of the content items.

6. A messaging system as claimed in claim 1, wherein the content items comprise:
    content collateral parts and
    message text uploaded by users.

7. A messaging system as claimed in claim 6, wherein the content manager state machine further comprises:
    means for managing a database of templates, in which each template is a group of identifiers of collateral parts and message text for re-use by a user.

8. A messaging system as claimed in claim 6, wherein the content manager state machine further comprises:
    means for managing a database of wrappers, in which each wrapper comprises links to selected content items.

9. A messaging system as claimed in claim 6, wherein the content manager state machine further comprises:
    means for grouping content items at the levels of a user organization, a user group written on organization, and individual users.

10. A messaging system as claimed in claim 1, wherein:
    the messaging engine state machine further comprises:
        means for generating each link in a manner whereby it is unique to the message, and
    the response management function state machine further comprises:
        means for monitoring said links to identify the responding recipient contacts.

11. A messaging system as claimed in claim 1, wherein the server further comprises:
    a response reporting function state machine comprising:
        means for generating management reports using data captured by the response management function.

12. A messaging system as claimed in claim 1, wherein the messaging engine state machine further comprises:
    means for allowing a user to directly enter content to a message without previously uploading it to the content manager.

13. A messaging system as claimed in claim 1, wherein the messaging engine state machine further comprises:
    means for parsing a header for content in the received message, and for using said header to identify relevant content in the content database.

* * * * *